United States Patent
Väärni et al.

(10) Patent No.: US 6,630,060 B1
(45) Date of Patent: Oct. 7, 2003

(54) DEVICE FOR CARRYING OUT AN ELECTRO-CHEMICAL TREATMENT

(75) Inventors: Markku Väärni, Siegburg (DE); Dirk Bube, Windeck-Imhausen (DE); Rolf Jansen, Oppenheim (DE); Alois Müller, Hennef-Happerschoss (DE)

(73) Assignees: WMV Apparatebau GmbH & Co. KG (DE); SurTec Produkte und Systeme für die Oberflächenbehandlung GmbH (DE)

( * ) Notice: Subject to any disclaimer, the term of this patent is extended or adjusted under 35 U.S.C. 154(b) by 0 days.

(21) Appl. No.: 09/614,578

(22) Filed: Jul. 12, 2000

(30) Foreign Application Priority Data

| Jul. 12, 1999 | (DE) | 199 32 523 |
| Jul. 12, 1999 | (DE) | 199 32 524 |

(51) Int. Cl.⁷ ............................ C25D 17/00; C25B 9/00
(52) U.S. Cl. ................. 204/213; 204/275.1; 204/263
(58) Field of Search ........................... 204/213, 275.1, 204/263

(56) References Cited

U.S. PATENT DOCUMENTS

| 4,162,951 A | * | 7/1979 | Tscherwitschke et al. | 204/213 |
| 4,174,261 A | * | 11/1979 | Pelligrino | 204/273 |
| 4,242,192 A | * | 12/1980 | Dunning, Jr. et al. | 204/213 |
| 5,755,948 A | | 5/1998 | Lazaro et al. | 205/143 |
| 5,817,220 A | * | 10/1998 | Chen | 204/213 |
| 6,228,230 B1 | * | 5/2001 | Li et al. | 204/222 |
| 6,306,269 B1 | * | 10/2001 | Landrette | 204/259 |

FOREIGN PATENT DOCUMENTS

| DE | 3023129 C2 | 4/1982 |
| DE | 3230108 C2 | 4/1986 |
| DE | 3107101 C2 | 11/1989 |
| JP | 52-43172 | 10/1977 |
| JP | 55-31198 | 8/1980 |

OTHER PUBLICATIONS

Article entitled Technologie der Galvanotechnik, Dipl. Ing. Bernhard Gaida, Doz. Dr. Ing. Kurt Assmann und ein Autorenteam (1996) Month Not Available.
Japanese Utility Model OPI H5–10471 (No date).
A copy from a book called "Barrel Plating", written by Mr. Yoshiaki Hoshino and published May 25, 1995 (4 pages).

* cited by examiner

Primary Examiner—Donald R. Valentine
(74) Attorney, Agent, or Firm—Harness, Dickey & Pierce, P.L.C.

(57) ABSTRACT

A method of carrying out an electro-chemical treatment, especially for electro-chemically coating conducting parts or parts made to be conducting, in a container which is filled with an electrolyte and in which there are arranged two electrodes which are connected to a constant voltage source, has the parts, while being treated in the electrolyte, being continuously re-arranged in the rotating basket. The parts are cathodically switched by a hub of the basket. The electrolytic solution is pumped in a cycle through the container, with the container remaining sealed so as to be gas-tight.

16 Claims, 4 Drawing Sheets

DEVICE FOR CARRYING OUT AN ELECTRO-CHEMICAL TREATMENT

CROSS-REFERENCE TO RELATED APPLICATION

This application is based upon and claims priority to German Patent Application 199 32 524.3 filed Jul. 12, 1999, and German Patent Application 199 32 523.5 filed Jul. 12, 1999, which applications are herein expressly incorporated by reference.

BACKGROUND OF THE INVENTION

The invention relates to a method of carrying out an electro-chemical treatment, especially, for electro-chemically coating conducting parts or parts made to be conducting. The parts are placed in a container which is filled with an electrolyte and includes two electrodes (anode, cathode) connected to a constant voltage source. Electro-chemical coating, i.e. galvanic coating, constitutes the major application of the invention. However, provided the anode and cathode are suitably exchanged, it is also possible to use the method for electro-chemical cleaning or electro-chemical abrasion. Furthermore, anodic/cathodic immersion painting may be included by the invention. In addition, the invention relates to a plant for carrying out an electro-chemical treatment, especially for electro-chemically coating conducting parts or parts made to be conducting. The plant includes a container filled with an electrolyte with two electrodes (anode, cathode) in the container connected to a constant voltage source.

Metallic or plastic parts with surfaces that are pre-treated to render them conductive are galvanically plated for corrosion protection purposes and partly, for decorative purposes. Depending on the size, shape and number of parts or products to be plated, different process techniques are applied.

In the case of continuous processes, endless belts, tubes or wires are pulled through a galvanic bath at a speed of 10 to 300 m/min. Contact of the cathode is established by rollers. The higher the speed, the higher the current density to be applied. In the case of zinc plating, up to 200 A/dm$^2$ can be achieved. This produces a plating thickness of 15 µm which takes about 17 seconds.

In the case of a rack method, parts are placed on to the rack, which is electrically connected to the cathode, and suspended in the galvanic bath. For zinc plating, the current density ranges between 2 to 4 A/dm$^2$. A plating thickness of 15 µm builds up in about 20 to 40 minutes. The rack method is suitable for very large parts, for example tubes several meters long and for small parts, for instance valuable turned parts. In general, the parts are placed on the rack manually, since the rack method is not suitable for mass production.

Articles in bulk, especially articles such as bolts, nuts, washers and the like are plated by a drum method. The parts are placed into a perforated drum which is immersed in the galvanic bath. Inside the slowly rotating plastic drum, flexible, isolated cables with non-insulated ends, move over the parts to provide the electric contact with the cathode. In the case of zinc plating, the current density ranges between 0.5 to 1.5 A/dm$^2$. This produces a plating thickness of 15 µm in about 60 to 160 minutes.

Methods and devices for surface coating are known from DE 31 21 397 C1 and DE 32 30 108 C2. Here, electro-chemical surface coating of small parts is shown. The parts are received in a drum which is rotatably drivable in a container. In a first axis position during the coating phase, coats the parts are coated at a low rotational speed. In a second vertically oriented axis position, after the treatment fluid has been drained off, the parts are centrifuged at an increased rotational speed. The means used to carry out the electro-chemical process are not explained in greater detail in these publications.

In continuous operating plants, rack and drum plants, electro-chemical surface treatment takes place in open baths. As a rule, if several such baths are arranged side by side, they form a considerable bath surface. While the processes take place, spray mist and vapors occur which constitute workplace pollution. Accordingly, considerable measures are taken to ensure extraction of the spray mist, vapors and gases which occur during the various process stages. Even in the case of smaller systems, exhaust quantities ranging between 5000 and 10,000 m$^3$/h have to be dealt with; in the case of larger systems, exhaust quantities ranging between 100,000 and 200,000 m$^3$/h may have to be extracted and treated. The exhaust air enters an air washer and is thereafter released into the open atmosphere. Corresponding quantities of fresh air have to be introduced from the outside, so that considerable ventilator capacities are provided. In the winter, sucked-in cold fresh air has to be heated which requires large amounts of energy, which, in turn, leads to the need for heat exchangers through which hot exhaust air is conducted in a counter flow to cold fresh air.

SUMMARY OF THE INVENTION

It is an object of the present invention to provide a method and device of the above-mentioned type which, while having a simple design, achieves a high coating output.

The objective is achieved by a method where the parts are connected cathodically by a hub of the basket. The electrolyte is pumped through the container in a cycle. The container is sealed to remain gas-proof.

Because the parts are connected cathodically by the hub of the basket, the power supply to the parts is ensured at all times. Circulating the electrolytic solution through the container ensures that the coating is applied to the parts in a uniform and defect-free way. In a preferred embodiment, the parts are re-arranged during the coating operation by rotating the basket around a horizontal axis.

In the container, preferably a flow speed of the electrolytic solution is maintained at least 1 m/min; especially approximately 10 m/min. It is possible to achieve high currency densities which lead to short coating times. The current density is preferably set to approximately 10 A/dm$^2$ in the case of zinc electrolytes and aluminum electrolytes and to approximately 25 A/dm$^2$ in the case of acidious copper electrolytes. In particular, an electrolytic solution temperature advantageous for the process is maintained in the container. Optionally, the electrolytic solution has to be heated or cooled within the closed cycle in a suitable place. In the case of non-aqueous electrolyte systems, the term "electrolytic solution" also includes salt melts.

A compensating container in the cycle for the electrolytic solution can ensure permanent freedom from gas in the container.

After a coating phase, the electrolytic solution is pumped out of the container. Remaining electrolyte is centrifuged off the surface of the parts under the effect of a centrifugal force. For this purpose, the basket axis is preferably first set to a vertical position.

This process can be followed by a washing operation in the container itself. Any water adhering to the parts is also centrifuged off the parts under the effect of a centrifugal force. To achieve a uniform coating, it is particularly advantageous if, during the electro-chemical treatment, the parts are continuously re-arranged during the electro-chemical treatment in the stream of electrolytic solution.

To continue to improve the process when using aqueous electrolytes, it is proposed that, a principle-related $H_2$-containing partial stream of the electrolytic solution (catholyte) is extracted in the vicinity of the parts, and a principle-related $O_2$-containing partial stream of the electrolytic solution (anolyte) is extracted in the vicinity of the anode during the coating phase. Accordingly, through-mixing is avoided and it ensures that in the vicinity of the parts, an electrolyte flow with a sufficiently high percentage of metal ions is added. To carry out the process economically and especially to recover part of the energy used for water decomposition purposes, an inert anode is used. The catholyte stream outside the container, while forming additional $H_2$, is fed with metal ions or metal ion complexes. The anolyte stream and the catholyte stream, especially if enriched with metal ions or metal iron complexes, are fed into the cathode chamber or, respectively, the anode chamber of a fuel cell.

For aprotic (proton-free/non-aqueous) electrolytes, and for aqueous electrolytes with very high current requirements, it is advisable to transport the catholyte and anolyte separately. This ensures the transport of the largest possible quantity of material.

Furthermore, it is the object of the invention to provide a method and a plant where the energy balance of the electro-chemical treatment of parts is improved. Preferably, the environmental balance is also more advantageous than in the case of prior art methods and plants.

The objective is achieved by a method where the electrolyte flows through the container. The decomposition products of the water at the electrodes, i.e. $H_2$ and $O_2$ are extracted separately from the electrolyte. The decomposition products are fed into a $H_2/O_2$ fuel cell for degassing the electrolyte and recovering energy. Accordingly, the percentage of energy used for the decomposition of water from the electrolytic solution, which decomposition takes place at the electrodes, can be recovered to a considerable extent or almost entirely.

According to a preferred method of operation, in a metal dissolving reactor, metal ions are added to the catholyte. While additional $H_2$ is formed, the $O_2$ excess which occurred during electro-chemical coating is compensated for completely. In this way, the fuel cell can be operated in an optimum way. With such complete combustion, up to 30% of the energy used for electro-chemical treatment can be recovered. This constitutes a considerable advantage with ever increasing energy prices. Thus, the additional expenditure required for the plant is amortized within an acceptable period of time. Since the gas irritants, cold-combusted $H_2$ together with the $O_2$ are eliminated, improved workplace conditions are achieved. In this embodiment it is also possible to guide the electrolytic solution in a completely closed cycle. Thus, the solution streams leaving the fuel cell can be returned into the container. In each case, the electrolytic solution has to be newly chemically determined. In particular, a metal dissolving process has to be integrated into the cycle. If, in an especially advantageous embodiment, the closed cycle takes place under the exclusion of air, the workplace values are further improved. Also, the considerable plant expenditure for extracting and washing air becomes largely superfluous.

In the container, a flow speed of the electrolytic solution of at least 10 m/min preferably has to be maintained. Accordingly, it is possible to achieve high current densities which lead to short coating periods. The current density is preferably set to at least 4 A/dm$^2$ in the case of a zinc electrolytic solution and to at least 10 A/dm$^2$ in the case of an acid copper electrolytic solution. The temperature for the electrolytic solution is also maintained, in the container so as to be advantageous to carry out the process. Optionally, the electrolytic solution is heated or re-cooled in the closed cycle in a suitable place.

The $H_2$ and $O_2$ gases fed separately into the fuel cell are advantageously extracted from the container directly in the place where they occur. $H_2$ is extracted together with the catholyte stream near the cathode. $O_2$ is extracted together with the anolyte stream near the anode. The catholyte stream can be fed into the anode chamber of the fuel cell. The anolyte stream can be fed into the cathode chamber of the fuel cell, without the need for any further separating measures in either case.

In order to produce identical quantities of $H_2$ and $O_2$, so that complete cold combustion can take place in the fuel cell, metal ions or metal ion complexes are added to the catholyte stream in a metal dissolving reactor, to form additional $H_2$.

The solution streams separately leave the chambers of the fuel cell. The streams are combined behind the fuel cell. After being analyzed and chemically re-determined in a compensating container, the streams are again fed into the container in the form of an electrolytic solution.

In a preferred way, the treatment container is emptied after completion of the electro-chemical treatment. Any electrolytic solution adhering to the parts is centrifuged off the parts under the influence of a centrifugal force. This operation can be followed by a washing operation in the container itself. Thereafter, any water adhering to the parts is centrifuged off the parts under the influence of a centrifugal force. To achieve a uniform coating, it is advantageous if, while being electro-chemically treated, the parts are continuously re-arranged in the stream of the electrolytic solution.

Furthermore, the initially mentioned objective is achieved by a device for carrying out an electro-chemical treatment. The device includes a hub of the basket in the form of a cathode. The container includes inflow and outflow means. Means for controlling the electrolytic cycle is connected with the inflow and outflow means. The container can be sealed so as to be gas-proof.

In the container, a rotatable basket receives the parts to be coated and continuously re-arranges the parts by the rotating basket around a horizontal axis during the coating operation. Furthermore, electrolytic fluid is continuously pumped and circulated through the container in a closed cycle. The electrolytic fluid is continuously reprocessed outside the container. Accordingly, it becomes possible to increase the current density while avoiding non-uniform coatings.

In a preferred embodiment, the anode is arranged half-cylinder-like parallel to the basket axis underneath the basket. Inflow means for the electrolytic solution are arranged between the basket surface and the anode.

To further improve the process, one outflow aperture for the catholyte is arranged inside the basket. At least one outflow aperture for the anolyte is positioned directly at the anode outside the basket. In particular, with reference to the axis of the drum, the at least one outflow aperture for the anolyte is positioned radially outside the anode in the container. The outflow apertures for the discharge of anolyte can be distributed over a half-cylinder surface at the container.

To achieve the considerable electric currents, a shaft journal at the basket leads through the housing and serves as a current conductor. The basket can be provided with an outer perforated electrically non-conductive cylindrical casing and an inner perforated highly conductive hollow hub. Again, the interior of the hollow hub, in respect of flow, is openly connected to a co-axial hollow journal penetrating the housing in order to extract any electrolytic solution which has flowed past the parts. A plurality of perforated tubular members are provided to supply the electrolyte solution. The tubular members are distributed over a half-cylinder surface and extend parallel to the axis of the basket. Optionally, one double-walled perforated half-cylinder is supplied through an end wall of the container.

A solution for the further above-mentioned objective comprises a plant to carry out an electro-chemical treatment. The plant includes a supply line to supply the electrolyte to the container. Two separate extraction lines extract the anolyte and catholyte from the container. A $H_2/O_2$ fuel cell with supply lines leading to an anode chamber and to a cathode chamber are connected to the extraction lines of the catholyte and anolyte, respectively. The plant parts which are briefly described here and whose further preferred embodiment will be described below, enable an electro-chemical treatment which, in turn, allows the above-described improvement in the energy balance and workplace values.

To achieve a closed electrolytic solution cycle, two separate lines exit from the anode chamber and from the cathode chamber of the fuel cell are combined and connected to the supply line to take electrolytic solution to the container. A metal dissolving reactor is arranged in the pipeline cycle for electrolytic solution. Especially, it is arranged in the line for the catholyte, behind the container. At the same time, the anode in the container is preferably an inert metal.

A $H_2/O_2$ fuel cell is provided in the form of a plate and frame cell. Accordingly, the size of the fuel cell can easily be adapted to the required capacity. The anodes and cathodes include of a catalytically coated material. The cell interior is divided by an ion exchanging membrane. The low exchange membrane forms the (cathodically switched) cathode chamber and the (anodically switched) anode chamber.

The container with the rotatably supported basket and the elements fixedly arranged therein is preferably pivotable in its entirety around a horizontal axis by 90°. A driving motor is coupled to the basket. The driving motor can be switched to a low speed when the basket axis extends in the horizontal direction to re-arrange the parts. When the basket axis extends in the vertical direction, the motor can be switched to a higher speed to centrifuge the parts.

As a result, the rotatable basket can be pivoted inside the container or together with the container from a horizontal axis position into a vertical axis position. Due to this measure it is possible, during treatment, to re-arrange the parts in the basket without having to load the basket into a different container, and subsequently to centrifuge the parts after the electrolytic solution has been pumped out of the container. Accordingly, it is possible to reduce the amount of electrolytic solution removed together with the parts which, at a later stage, have to be taken out of the container.

To further reduce the amount of electrolyte to be removed, it is possible, subsequently, to carry out washing operations in the rotating basket inside the container. Washing fluid is introduced into the container and then pumped off. The parts subsequently are centrifuged together with the basket.

The greatest economic benefit of the inventive method and of the inventive device will probably be derived by the zinc plating process to which reference will be made below. A zinc plating plant with a device in accordance with the invention shortens throughput times, saves energy and space, reduces re-loading operations for the parts and minimizes waste water and other waste.

A treatment cell, in this case, is a pivotable galvanic container in which the parts are electrolytically coated. To be able to achieve the high current densities required, the electrolytic solution has to flow through the parts and the anode at a high speed. The hydrogen developing at the cathodically switched parts and the oxygen developing at the anode are extracted together with the respective stream of electrolytic solution.

The catholyte stream contains finely distributed hydrogen gas and is depleted in respect of zinc. To increase the zinc content, the catholyte stream is conducted through a zinc dissolving reactor which is fed with metallic zinc, with additional hydrogen developing. From the reactor, the catholyte stream is guided into the anode chamber of the $H_2/O_2$ fuel cell. The gaseous hydrogen is dissolved under oxidation. The anolyte stream is guided directly into the cathode chamber of the $H_2/O_2$ fuel cell where the gaseous oxygen is dissolved under reduction. The two electrolytic solution streams, which are gas-free and low in gas, respectively, flow out of the fuel cell and are combined and returned into the coating cell. Thus, the fluid system is closed. After completion of the coating operation or following the coating phase, the coating cell is pivoted by 90° into a position where the basket axis extends in the vertical direction. The electrolytic solution is pumped off and the solution residue is centrifuged off the parts by driving the basket at an increased rotational speed of approximately 300 rpm. In subsequent treatment stages, water for rinsing purposes or other treatment media can be introduced into the coating cell and subsequently pumped off. Optionally, the parts can be circulated with a horizontal basket axis. This optional operation is, in any case, followed by a centrifuging operation at an increased speed, with a vertical basket axis. Thereafter, the parts are removed from the coating cell with the basket, in a vertical axis position, by lifting out the basket from the coating cell.

In a practical application, the basket can have an inner diameter of 250 mm. The basket hollow hub from which catholyte is extracted has a diameter of 100 mm. The basket can have a height of 300 mm. The resulting volume is approximately 12 liters. The volume can be filled up to one third with parts.

If the parts are metric bolts M8×25 for example, the resulting bulk weight is 4 kg/l and the resulting specific surface area is 12 $dm^2$/kg. In consequence, if a quantity of the type of bolts has been filled into the basket, a surface area of approximately 200 $dm^2$ is obtained. To achieve a current density of 10 A/$dm^2$, a rectifier capacity of at least 2000 A is required. If the batch size were to be increased to 100 to 200 kg, capacities of 12,000 to 24,000 A would be needed.

With a current density of 10 A/$dm^2$ the coating time is only 4 to 6 minutes. Because of the high load per liter, the ratio of quantity of electricity to volume of electrolyte, an increase in the temperature of the electrolyte occurs. This is advantageous for the separation rate and the electricity exploitation. Care has to be taken to ensure that the additives used when determining the composition of the electrolytic solution function in the required way at such temperatures. If necessary, the electrolyte may be heated or cooled.

According to a special example, the coating unit is filled with an aqueous zinc electrolyte with the following composition:

20 g/l zinc
250 g/l KOH
50 g/l K$_2$CO$_3$
10 ml/l SurTec 704 I (commercial additive)
1 ml/l SurTec 704 II (commercial additive)
10 ml/l SurTec 704 R (commercial additive)
5 ml/l SurTec 701 (commercial additive).

The basket is filled with 12 kg of metric steel bolts M8×25. As described, the bolts are cathodically zinc-coated in the coating unit for 6 minutes at 10 A/dm$^2$, whereupon the bolts comprise an average zinc coating thickness of 13 μm.

To achieve the high separation rate, an extremely good electrolyte convection in the vicinity of the part surface constitutes an essential factor. The electrolyte convection is ensured by re-arranging the parts as a result of circulating the parts in the basket and by means of setting uniform inflow and outflow conditions in the coating cell.

The inert anode is provided in the form a catalytically coated anode in order to ensure the highest possible anodic current densities. The half-cylinder-shaped anode is perforated. The electrolyte flows through from the inside and outside at a high flow speed inside the coating cell.

In a zinc dissolving reactor, metallic zinc in the alkaline electrolytic solution, while in contact with a catalytically coated material, is dissolved while hydrogen develops.

This process stage is applied to supplement the zinc used in the coating cell. The zinc dissolving reactor provided for this purpose is sealed so as to be airtight towards the outside. The catholyte which, in the form of a partial stream extracted from the interior of the basket after having flowed past the cathodically switched parts, flows through the reactor. As a result of the proceeding, the catholyte is depleted of zinc and enriched with hydrogen gas. The zinc dissolving reactor is supplied with additional zinc, and the hydrogen content is additionally increased. From the zinc dissolving reactor, the catholyte is conducted into the fuel cell. In the course of the continuous operation, at the cathode of the coating cell and in the zinc dissolving reactor, together, there is produced, at any point in time, twice as much hydrogen as there is produced oxygen at the anode of the coating cell. The H$_2$/O$_2$ ratio thus corresponds to the requirements of a complete, residue-free, cold reaction in the H$_2$/O$_2$ fuel cell relative to water (H$_2$O).

In view of the high load per liter, the ratio of the quantity of electricity to the volume of electrolyte, rapid changes occur in the electrolytic solution. The changes are preferably compensated for by fully automatic process control means. The control means monitor and set all major electrolyte parameters. Apart from the conventionally recorded and controlled parameters of temperature, pressure, voltage and current, these parameters are as follows:

| Values to be Measured | Measuring Method | Values to be Set |
| --- | --- | --- |
| Zinc content | Cyclic voltammetry | Exchange rate with % of dissolved zinc |
| KOH content | Conductivity measurement | Addition of concentrated KOH solution |
| Organic additives | Cyclic voltammetry and chronoamperometry | Addition of additive concentrates |

According to a further special example, a coating unit modified in such a way that the electrolyte cycle comprises neither a metal dissolving reactor nor a fuel cell is filled with a water-free aprotic aluminum electrolyte with the following composition (at room temperature):
250 g/l AlEt$_3$ (triethylaluminium)
150 g/l AliBut$_3$ (trisobuthylaluminium)
80 g/l KF (potassium fluoride)
in toluene as a solvent. The basket is filled with 12 kg of metric steel bolts M8×25. The basket is inserted into the coating cell which is then hermetically sealed. The coating cell is first flooded and rinsed with dried nitrogen and argon, respectively. The aluminum electrolyte is pumped into the coating cell. The aluminum electrolyte displaces the nitrogen and argon respectively from the cell. As described, the bolts are cathodically aluminized for 5 minutes at 10 A/dm$_2$. The electrolyte is pumped and centrifuged off. The bolts comprise an average aluminum coating thickness of 15 μm.

The treatment cell (coating cell) is preferably integrated into the overall plant of treatment machines whose individual machines can carry out the following treatment stages for example:
de-oiling
degreasing
pickling
electrolytic cleaning
electrolytic coating
chromating; blue-, yellow- or black-chromating sealing, with the fourth and fifth stages being carried out by an inventive treatment cell. The basket, which can be lifted out of the treatment cell, has to be designed in such a way that it can be inserted into all the other individual machines of the plant.

If, after each treatment stage, the parts are rinsed in the respective machine and dried by being centrifuged, any carry-over between the treatment operations will be minimized.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment is illustrated in the drawings and will be described below.

DETAILED DESCRIPTION OF THE PREFERRED EMBODIMENT

Figure 1:
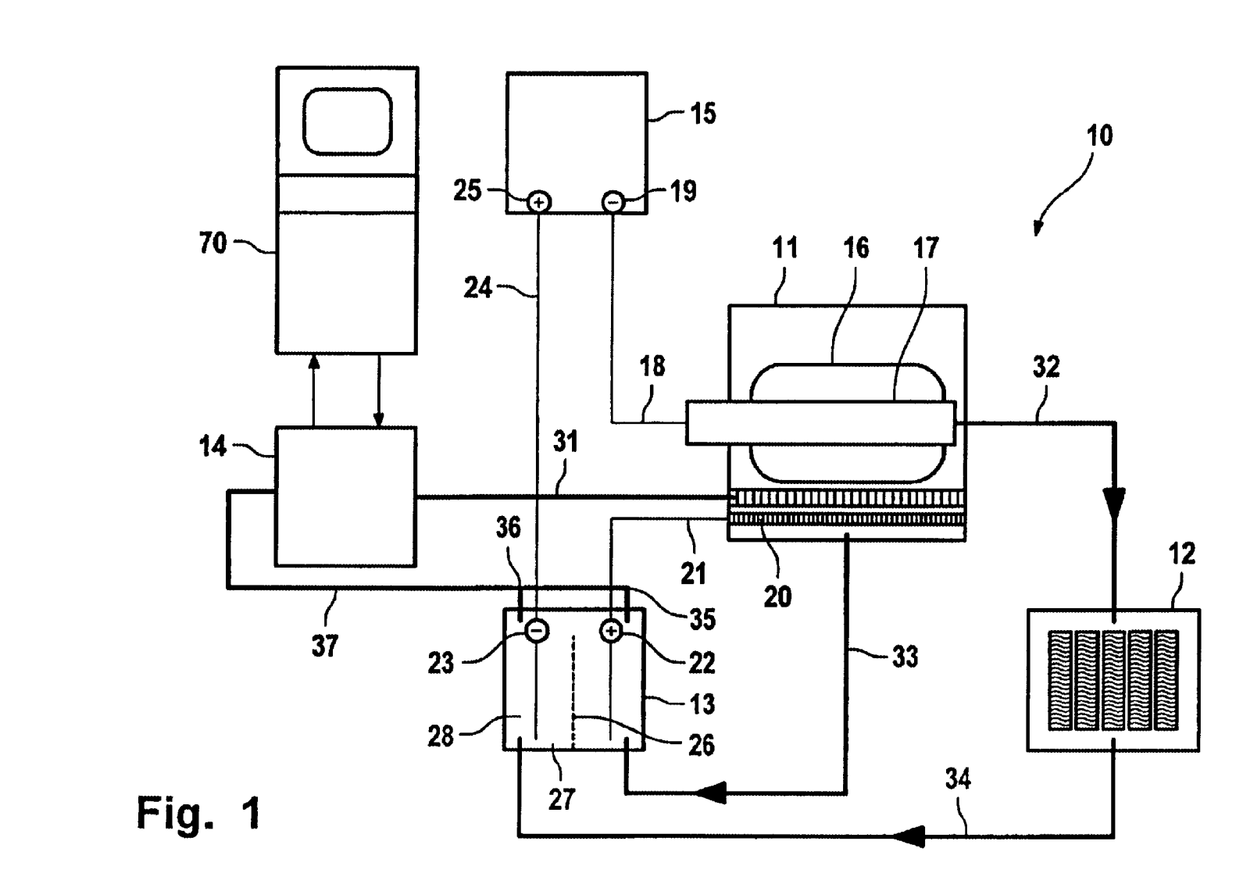
FIG. 1 is a schematic view of a simplified diagram of a plant including a device in accordance with the invention.

FIG. 1 shows a diagram of a plant designed for electrochemical coating. A central coating cell 10 includes a sealed container 11 which is connected to a metal dissolving reactor 12. A H$_2$/O$_2$ fuel cell 13 is connected with the reactor 12 and a compensating container 14 which is connected with an automatic bath control and regulating means 70 in a closed electrolytic cycle. Furthermore, the central coating cell 10 is electrically connected to the H$_2$/O$_2$ cell 13 and to a rectifier 15, which constitutes the constant voltage source. The details will be explained below.

In the container 11 of the coating cell 10, a basket 16 is arranged with a horizontally extending axis. The central hub of the basket 16 forms the cathode 17. The cathode 17, via an electric line 18, is connected to the minus pole 19 of the rectifier 15. Inside the container 11, underneath the cathode 17, an anode 20 is arranged which is insulated relative to the container 11. The anode, via an electric line 21, is connected to the plus pole 22 of the fuel cell 13. Furthermore, the minus pole 23 of the fuel cell 13 is directly connected, via an electric line 24, to the plus pole 25 of the rectifier 15. In consequence, the rectifier 15 and the fuel cell 13 are electrically connected in series relative to the coating cell 10. In the fuel cell 13, a membrane 26 separates a cathode chamber 27 and an anode chamber 28 from one another.

The electrolytic cycle starts from the compensating container 14. A supply line 31 guides an electrolyte, whose composition is correctly determined, from the compensating container 14 to the container 11. The goods (parts) contained in the centrifugal basket 16 are electro-chemically coated, with the water of the electrolytic solution decomposing at the electrodes. As a result, a $H_2$-containing catholyte occurs at the cathode 17. The catholyte, in the vicinity of the cathode, is extracted from the interior of the hub via an extraction line 32 and is fed into the metal dissolving reactor 12. In the metal dissolving reactor 12, coating metal is dissolved in the electrolyte, with additional $H_2$ being released which is transported away by the catholyte.

In the vicinity of the anode 20 in the container 11, an $O_2$-containing anolyte is extracted through an extraction line 33. The anolyte is directly transported to the cathode chamber 27 of the fuel cell 13. The catholyte is directed through a line 34 from the metal dissolving reactor 12 to the anode chamber 28 to the fuel cell 13. Cold combustion of $H_2$ and $O_2$ to water takes place in the fuel cell 13. The two exit lines 35 from the cathode chamber and 36 from the anode chamber are combined in a common line 37 which leads to the compensating chamber 14 where the composition of the electrolytic fluid is accurately chemically set. Thus, a closed electrolytic cycle occurs from the compensating chamber 14 via the sealed container 11 and the fuel cell 13. A partial stream (catholyte) is guided between the sealed container 11 and the fuel cell 13, via the metal dissolving reactor 12.

FIG. 2, again in the form of a diagram, shows an actual plant for electro-chemical coating purposes according to FIG. 1, with a larger number of details. The basic components again are the treatment cell 10 with the sealed container 11. The basket 16 with the cathode 17 in the form of a hollow hub; the anode 20; the metal dissolving reactor 12; the fuel cell 13 and the compensating container 14; and the rectifier 15. Details regarding the treatment cell 10 will be explained more closely with reference to a further illustration. The basket 16 is rotatingly driven by a motor. A pump 42 is in the extraction line 32 for the catholyte. Behind the pump, line 32 is shown which leads to the metal dissolving reactor 12. A shortcircuit line 38 branches off of line 32 bypassing the zinc dissolving reactor 12 and leads directly to the supply line 34 leading to the fuel cell 13. Shut-off valves 43, 45, 47 as well as return valves 44, 46 serve controlling purposes. Accordingly, the metal dissolving reactor 12 with the metal elements 48 is activated only temporarily. The electrolyte flows through the reactor 12 only temporarily. In the extraction line 33 for the anode 20, a pump 57 is also provided. A shut-off valve 58 and a return valve 59 serve to shut off the sealed container 11.

Figure 2:
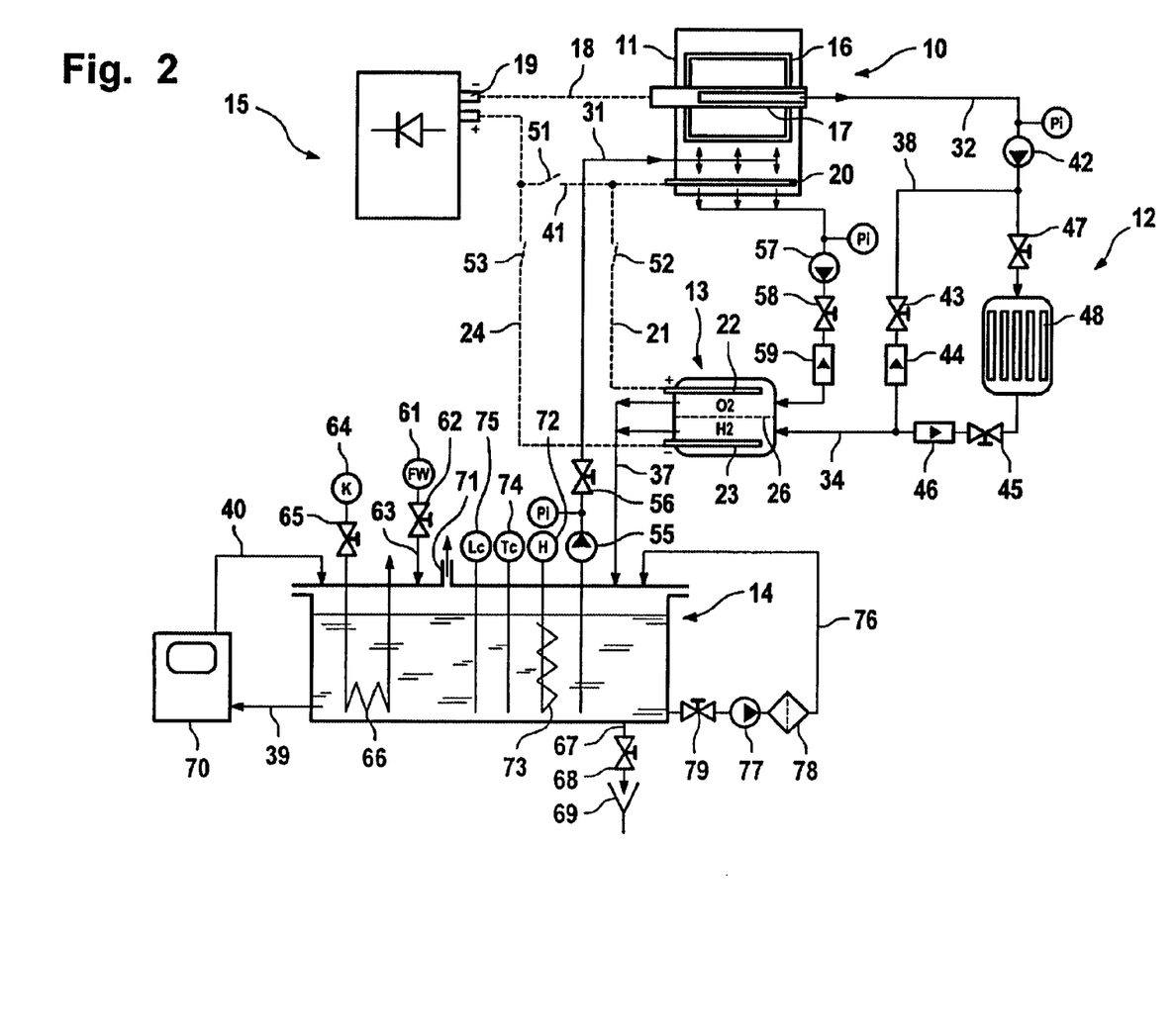
FIG. 2 is a schematic view of a concretely executed diagram of a plant including a device in accordance with the invention.

The cathode 22 and the anode 23 as well as the membrane 26 are drawn into the fuel cell 13. The minus pole 19 of the rectifier 15 is directly connected to the cathode 17 of the treatment cell 10. The electric line 18 is not interrupted, whereas the electric line 24 is directly connected to the anode 23 of the fuel cell 13. The line 21 leading to the anode 20 of the treatment cell 10 is connected to the cathode 22 of the fuel cell 13. The fuel cell 13 can be bridged by a shortcircuit line 41. An interrupter switch 53 is arranged in the line 24. An interrupter switch 51 is arranged in the shortcircuit line 41. The interrupter switches enable the fuel cell 13 and the constant voltage source 15 to be connected in series.

In this case, too, the lines 35, 36 for electrolyte which emerge from the fuel cell 13 are combined to form a common supply line 37 which leads to the compensating container 14 of the treatment bath. A pump 55 and a shut-off valve 56 are provided in the supply line 31 for electrolyte. The supply line 31 starts from the fuel cell 13. In this way, the electrolytic cycle is closed in the same manner as described above. At the lines 31, 32 and 33, there are shown pressure indicators given the reference symbol "PI".

A fresh water source 61 can be used to fill the compensating container 14 via a line 63 provided with a shutoff valve 62. Via a cooling coil 66 provided with a shut-off valve 65, a coolant source 64 conducts coolant through the compensating container 14. An outflow line 67 with a shutoff valve 68 starts from the compensating container 14 and ends in a channel 69. The compensating container 14, which is sealed on top, includes a suction muff 71. The compensating container 14 is shown to include a heating source 72 which heats a heating spiral 73. In addition, the compensating container 14 has a temperature control 74 given the reference symbol (TC) and a level control given the reference symbol "LC". Furthermore, a circulation loop 76 is provided with a pump 77, a filter 78 and a shutoff valve 79. The automatic bath control and control means 70 are connected via lines 39, 40 to the compensating container. The direction of flow in the lines is indicated by arrows.

Figure 3:
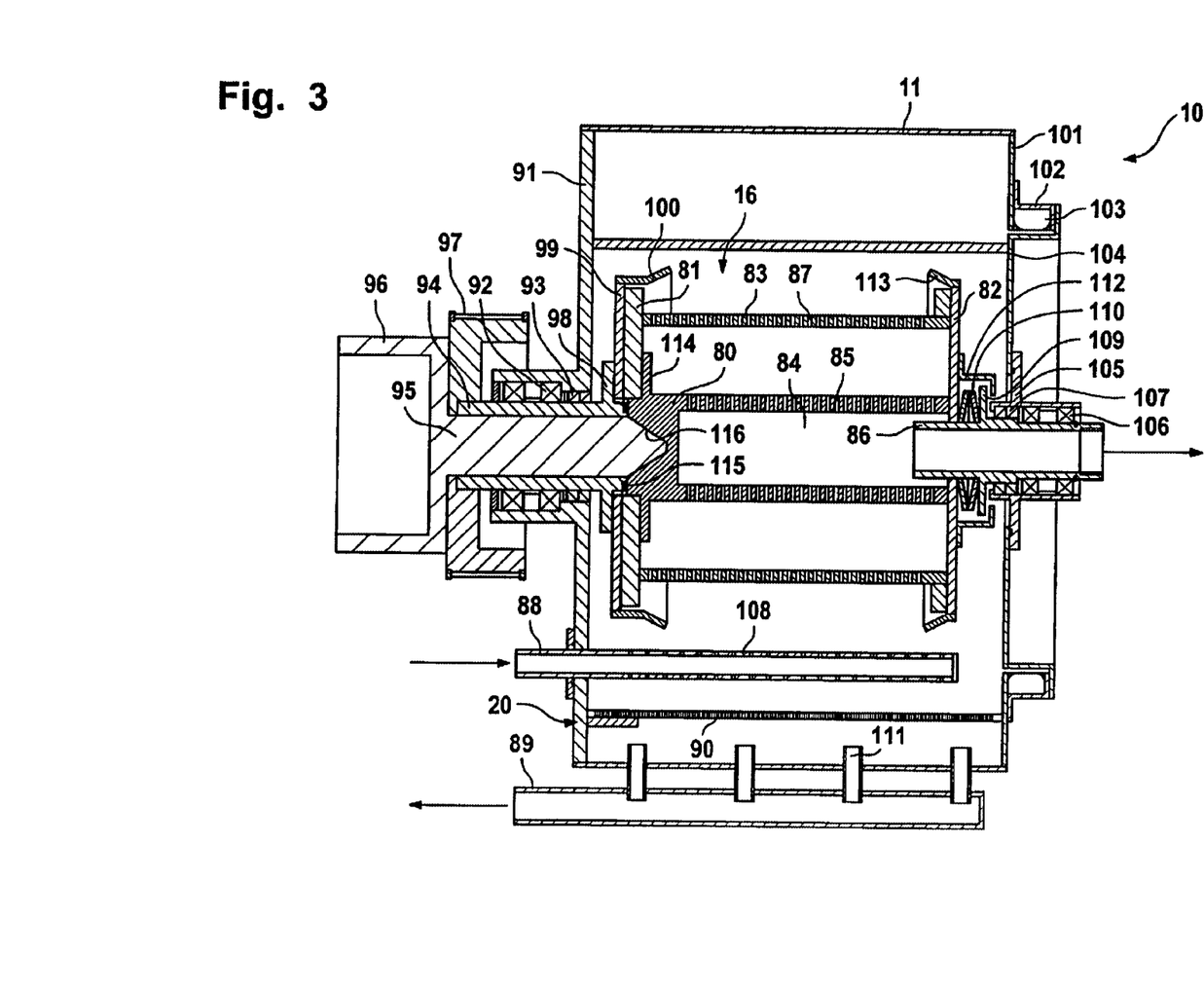
FIG. 3 is a section view of an inventive device in accordance with the invention.

FIG. 3 shows the treatment cell 10 with the container 11 in detail and in an enlarged scale. The basket 16 and the cathode, in the form of a hollow hub 80, are shown with further details. The basket has a base 81, a cover 82 and an annular casing 83. The hollow hub 80 includes an interior 84 and radial apertures 85 through which electrolytic fluid can enter from the outside and is pumped off by a hollow journal 86. A supply pipe 88 is underneath the basket 16. The supply pipe 88 has apertures 108 and is connected to the supply line for electrolytic fluid.

Electrolyte, is uniformly distributed along the axial length of the container 11 from supply pipe 88 and can emerge underneath the basket 16. A plurality of parallel supply pipes 88 can be distributed at identical distances over a half-cylinder and adapted to the shape of the basket 16. The electrolytic fluid flows upwards over the basket annular casing 83 provided with apertures 87 to the cathode 17 and downwards to the anode 20.

The anode 20 is preferably in the shape of a half-cylinder arranged underneath the basket 16 and extends approximately as far as the central axis, and comprises apertures 90. A collecting pipe is shown radially outside the container 11. Electrolytic fluid which has flowed through the anode is discharged via individual muffs 111 from the container 11. A plurality of collecting pipes 89 can be distributed in parallel relative to one another over the lower half of the container.

Bearing means 92 and seals 93 are provided in a solid base part 91 of the container 11. A bearing journal 94 is supported in the bearing member 92. A conductor journal 95 is inserted into the bearing journal 94. A slip ring 96, with a larger diameter, is attached to journal 95. A crown wheel 97, for driving the journal 94, is positioned on the bearing journal 94 and bolted to the latter and to the conductor journal 95. The shaft journal 94 has a flange 98 inside the housing 11. A basket holding base 99 with introducing claws 100 is bolted onto the flange 98.

The opposed end face of the container 11 is sealed by an annular cover plate 101. The cover plate 101 carries an annular flange 102 whose inwardly opening U-shaped cross-section contains a pressure hose 103. A cover 104 is inserted in contact with the annular flange 102. The pressure hose 103 sealingly rests against the cover 104 when pressure is applied. The cover 104 carries a bearing sleeve 105 with bearing means 106 and sealing means 107.

Hollow journal 86 is supported and sealed by the bearing 106 and seal 107 means. The hollow journal 86 is provided with a flange 109 which supports Belleville springs 110. The cover 82 is positioned and centered in the inner end of the hollow journal 86. The cover 82 is held at the flange 109 by an annular flange 112 such that it cannot be lost and is supported on the flange 109 via Belleville springs 110. Introducing claws 113 are arranged on the outside of the cover 82.

The basket 16 is composed of hollow hub 80 with an interior 84 which is open towards the cover 82. The base 81 is bolted to the hollow hub 80 via an annular flange 114. The base 81 carries the annular casting 83 which is sealed by the cover 82. The interior 84 is open towards the cover 82. A conical recess 116 is provided in the base of the hollow hub 80. The recess 116 is engaged by the conical point of the bearing journal 95 in a friction-locking way. The hollow hub 80 is sealed relative to the shaft 94 by an O-ring seal 115.

In the hollow hub 80 it is possible to see the radial apertures 85. In the annular casing 83 the radial apertures 87 are present. The interior 84 is connected to the environment via the hollow journal 86. The catholyte can be sucked out of the interior via the hollow journal 86. Underneath the basket 16 there is provided a supply pipe 88 which extends parallel to the basket axis and which, through the base 91, is guided out of the housing 11. The supply pipe 88 is provided with a plurality of bores 108 in its cylindrical face and serves to supply electrolytic solution into the housing 11 from the outside.

Again underneath the pipe 88 is an anode 20 which extends between the base 91 and the cover 101. The anode is half-cylinder-like and is guided around the basket 16. Near the anode 20, a plurality of radial pipe muffs 111 is guided through the casing of the housing 11. The radial pipe muffs 111 all end in a horizontally positioned collecting pipe 89. The electrolytic fluid (anolyte) is extracted from the housing 11 through pipe 89.

Figure 4:
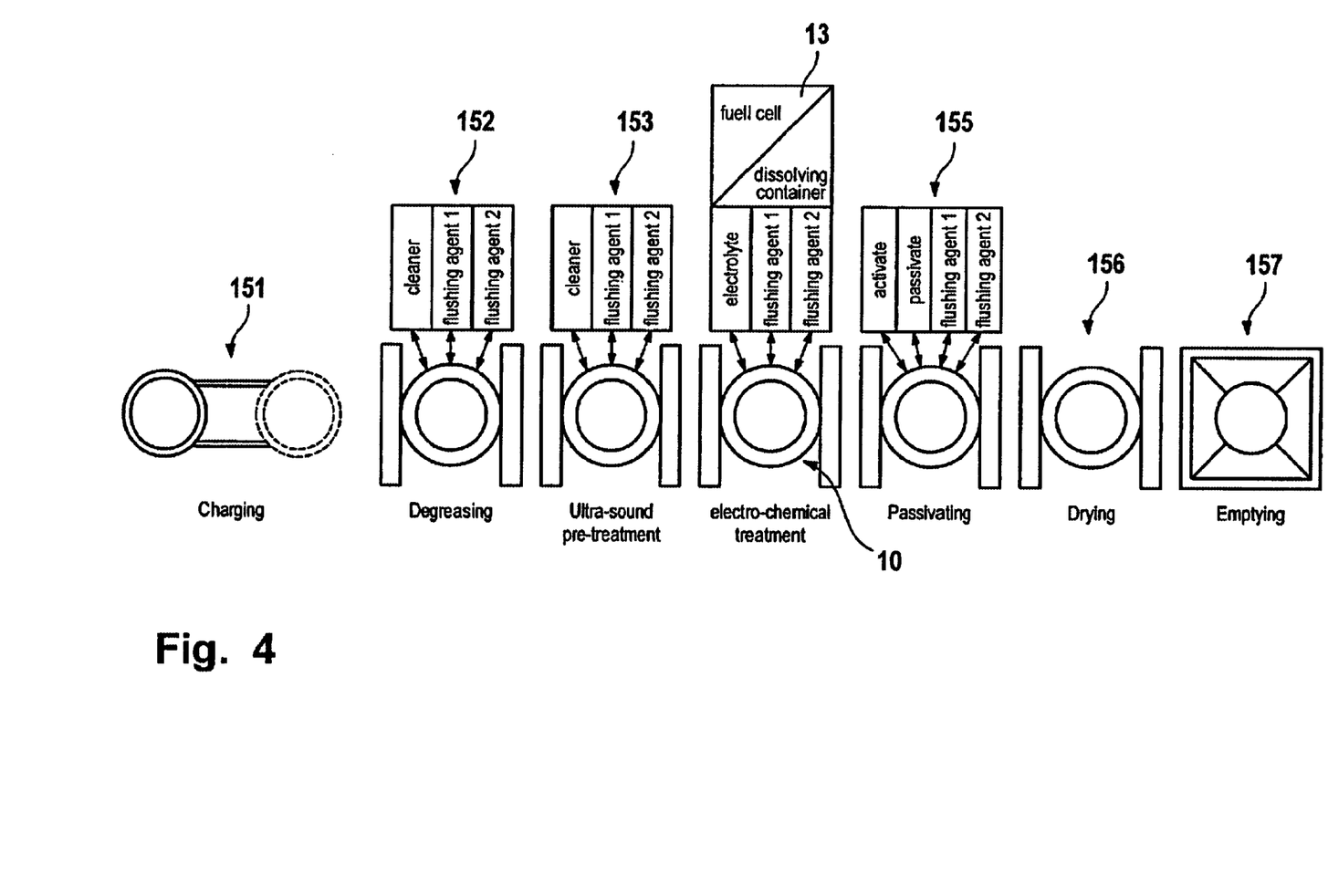
FIG. 4 is a schematic view of the entire treatment plant into which an inventive device is integrated.

FIG. 4 shows a complete plant for surface coating purposes in a plan view (erected view). The plant has several individual machines into which it is possible to insert a basket 16 filled with parts to be coated. Shown, from left to right, are a charging station 151 for loading an individual basket, a degreasing machine 152, an ultrasound pre-treatment machine 153, an electro-chemical treatment machine 10, a passivating machine 155 and a centrifugal drier 156, and finally an emptying station 157. Captions explain the type of machine and further boxes give the individual treatment stages.

The charging station 151 is shown to contain a basket 16 which can be filled with parts. The parts can be moved into the position indicated by dashed lines from where the basket 16 can be gripped by lifting and transport means controllable by all machines, and inserted into the individual machines.

At the degreasing station 152, the parts are successively subjected to a cleaning operation involving a cleaning fluid. Also, the parts are subjected to two rinsing operations involving rinsing water.

In the ultrasound pre-treatment station 153, a cleaning operation is carried out using a cleaning fluid. Two rinsing operations using rinsing water are conducted. An ultrasound device is operated at the same time.

In the treatment cell 154, the parts undergo a coating operation using electrolytic fluid. Two rinsing operations using rinsing water are likewise conducted. In the vicinity of the station, there are symbolically indicated a fuel cell 13 and a metal dissolving reactor 12.

In the passivating machine 155, the treatment stages of activating, passivating and subsequently two rinsing operations are carried out one after the other. In the centrifugal drier 156, any adhering fluid is centrifuged off. This operation can also take place in the previous four machines after the last rinsing operation. The emptying station 157 consists of an open funnel into which it is possible to tip the parts out of the basket which was lifted out of the centrifugal drier.

While the above detailed description describes the preferred embodiment of the present invention, the invention is susceptible to modification, variation and alteration without deviating from the scope and fair meaning of the subjoined claims.

What is claimed is:

1. A device for carrying out an electro-chemical treatment comprising:

a container for an electrolyte;

a cathode and an anode provided in said container, said cathode and anode connected with a constant voltage source;

a basket provided in said container and which basket receives the parts, said basket to be immersed in the electrolyte, said basket being rotatable around a horizontal axis, a hub of the basket being placed inside the basket and being provided in the form of a cathode;

inflow and outflow means for said electrolyte provided in said container;

means for controlling the cycle electrolyte coupled with said inflow and outflow means; and means for sealing the container so that the container can be sealed so as to be gas-proof or airtight.

2. A device according to claim 1, wherein the container cylindrically surrounds the outside of the basket.

3. A device according to claim 1, wherein the anode is arranged half-cylinder-like parallel to the basket axis underneath the basket.

4. A device according to claim 1, wherein an outflow aperture for a catholyte is arranged inside the basket and that at least one outflow aperture for an anolyte is positioned directly at the anode outside the basket.

5. A device according to claim 4, wherein with reference to the axis of the basket the at least one outflow aperture for the anolyte is positioned radially outside the anode.

6. A device according to claim 1, wherein an outflow aperture for the discharge of anolyte are distributed over a half-cylinder surface at the container.

7. A device according to claim 1, wherein said inflow means for the electrolyte solution are positioned between the basket surface and the anode.

8. A device according to claim 1, wherein a shaft journal at the basket is guided through the housing and serves as a current conductor.

9. A device according to claim 1, wherein the basket comprises an outer perforated cylindrical casing made of an electrically non-conducting material and said hub being on an inner perforated hollow hub made of a highly conducting material.

10. A device according to claim 9, wherein the interior of the hollow hub in respect of flow is openly connected to a co-axial hollow journal penetrating the housing.

11. A device according to claim 1, wherein at least one perforated tubular member is provided for supplying the electrolyte solution, said at least one perforated tubular member extending parallel to the axis of the basket and emerging from an end wall of the container.

12. A device according to claim 1, wherein the container, together with the basket, rotatably supported therein and the elements firmly installed therein, is pivotable around a horizontal axis by 90°.

13. A device according to claim 12, wherein a driving motor, in respect of drive, is coupled to the basket which, with a horizontal basket axis, can be switched to a low speed for re-arranging the parts and, with a vertical basket axis, can be switched to an increased speed for centrifuging the parts.

14. A device according to claim 1, wherein the substantially cylindrical container comprises a circular cover which accommodates bearing means for the basket.

15. A device according claim 1, wherein the basket can be axially released from a journal acting as a conductor.

16. A device according to claim 1, wherein the basket, in turn, comprises a circular releasable cover.

* * * * *

UNITED STATES PATENT AND TRADEMARK OFFICE
CERTIFICATE OF CORRECTION

PATENT NO. : 6,630,060 B1  
DATED : October 7, 2003  
INVENTOR(S) : Väärni et al.

It is certified that error appears in the above-identified patent and that said Letters Patent is hereby corrected as shown below:

<u>Title page, Item [54] and Column 1, line 1,</u>  
Title, before "DEVICE" insert -- METHOD OF AND --.

<u>Column 2,</u>  
Line 2, delete "coats".

<u>Column 3,</u>  
Line 21, "iron" should be -- ion --.

<u>Column 5,</u>  
Line 39, after "include" delete "of".

<u>Column 7,</u>  
Line 19, after "form" insert -- of --.

<u>Column 10,</u>  
Line 48, delete "," after "Electrolyte".

<u>Column 11,</u>  
Line 27, "casting" should be -- casing --.

<u>Column 12,</u>  
Line 43, delete "cycle electrolyte" and insert -- cycling of the electrolyte, said controlling means --.  
Line 60, before "anolyte" insert -- an --.

<u>Column 14,</u>  
Line 10, after "according" insert -- to --.

Signed and Sealed this

Tenth Day of August, 2004

JON W. DUDAS  
*Acting Director of the United States Patent and Trademark Office*